(12) United States Patent
Hurd

(10) Patent No.: US 10,549,576 B2
(45) Date of Patent: Feb. 4, 2020

(54) TRANSFORMABLE WHEEL

(71) Applicant: Carter Hurd, Powell, OH (US)

(72) Inventor: Carter Hurd, Powell, OH (US)

(*) Notice: Subject to any disclaimer, the term of this patent is extended or adjusted under 35 U.S.C. 154(b) by 456 days.

(21) Appl. No.: 15/339,025

(22) Filed: Oct. 31, 2016

(65) Prior Publication Data

US 2017/0120672 A1 May 4, 2017

Related U.S. Application Data

(60) Provisional application No. 62/250,099, filed on Nov. 3, 2015.

(51) Int. Cl.
*B60B 19/04* (2006.01)
*B60B 9/28* (2006.01)

(52) U.S. Cl.
CPC ............. *B60B 19/04* (2013.01); *B60B 9/28* (2013.01); *B60B 2900/351* (2013.01); *B60B 2900/721* (2013.01)

(58) Field of Classification Search
CPC .. B60B 9/00; B60B 9/28; B60B 19/00; B60B 19/04
See application file for complete search history.

(56) References Cited

U.S. PATENT DOCUMENTS

| | | |
|---|---|---|
| 1,393,709 A | 10/1921 | Slauson |
| 1,404,051 A | 1/1922 | Ollivier |
| 1,412,359 A | 4/1922 | Lacy |
| 1,427,418 A | 8/1922 | Roberts |
| 1,459,361 A | 6/1923 | Cole |
| 1,532,075 A | 3/1925 | Poole |
| 1,756,212 A | 4/1930 | Reynolds |
| 1,781,461 A | 11/1930 | Huenemann |
| 3,016,270 A | 1/1962 | Tucker, Sr. |
| 4,773,889 A | 9/1988 | Rosenwinkel et al. |
| 5,487,692 A | 1/1996 | Mowrer et al. |
| 6,502,657 B2 | 1/2003 | Kerrebrock et al. |
| 6,860,346 B2 | 3/2005 | Burt et al. |
| 7,794,300 B2 | 9/2010 | Moll et al. |
| 8,197,298 B2 | 6/2012 | Willett |
| 2016/0303901 A1* | 10/2016 | Kim ........................ B60B 19/02 |

OTHER PUBLICATIONS

Tyler Lee, Researchers Develop Robot With Origami Wheels That Can Shrink/Expand, www.ubergizmo.com, Jul. 21, 2014, pp. 1-2.

* cited by examiner

*Primary Examiner* — Jason R Bellinger
(74) *Attorney, Agent, or Firm* — Standley Law Group LLP; Eric Gayan

(57) ABSTRACT

A transformable wheel and method of transforming a wheel between open and closed positions. An exemplary transformable wheel may include a plurality of wheel segments (legs), including at least one passive leg and at least one active leg. The active leg(s) is actuated by a powered active leg transformation mechanism, while the passive leg(s) is actuated by a passive leg actuation mechanism that employs an elastic element, spring, or other passive actuator to automatically move the passive leg(s) toward the current position of the active leg(s).

19 Claims, 5 Drawing Sheets

TRANSFORMABLE WHEEL

CROSS-REFERENCE TO RELATED APPLICATIONS

This application claims the benefit of U.S. Provisional Application No. 62/250,099, filed on Nov. 16, 2015, which is hereby incorporated by reference as if fully recited herein.

TECHNICAL FIELD

Exemplary embodiments described herein are directed generally to transformable wheels, and more particularly to transformable wheels having at least one passive leg and at least one active leg.

BACKGROUND

Common mobile robot and/or vehicle uses, such as search-and-rescue, police, toy, and military applications, require good performance in both urban and natural environments. The surfaces and obstacles seen in these environments change form one region to the next. Some regions include mostly smooth and flat ground. Other regions include obstacles that must be crossed, or loose, shifting material. This terrain variation makes navigation difficult for conventional wheeled vehicles, wheeled robots, and conventional wheeled radio controlled vehicles.

Conventional wheels are often designed specifically for the terrain of one region, which results in less than ideal performance in other terrain. Wheels designed for smooth terrain are often not able to effectively overcome large obstacles and rough terrain. Wheels designed for overcoming large obstacles, for example, wheels of non-uniform shape such as legged-wheels, are often less efficient over smooth surfaces than wheels intended for smooth surfaces. The lack of a singular wheel design that can equally effectively navigate terrain suggests a need for a wheel that can transform as needed to best accommodate the particular terrain to which it is subjected.

Generally speaking, a transformable wheel can alter its shape and dimensions (e.g., diameter) to better handle changing terrain. When round, a transformable wheel can move quickly and efficiently over flat ground. When the wheel shape transforms too non-circular, a transformable wheel can better grip and clear obstacles. Thus, a transformable wheel can significantly increase the versatility of a wheeled mobile robot or another wheeled vehicle.

Various transformable wheel designs are known. However, when a conventional transformable wheel increases in diameter, the weight of the robot/vehicle to which the wheel is installed must be lifted as the wheel expands. The transformable wheel, the mechanism by which wheel transformation is accomplished, and the actuator driving the mechanism and causing the transformation, must be able to overcome the weight of the robot/vehicle and withstand the forces caused by lifting the robot/vehicle during expansion of the wheel. At a minimum, this puts stress on the wheel and the mechanism that transforms the wheel.

In light of the deficiencies revealed by the foregoing comments, it is desirable to provide a transformable wheel and a method of wheel transformation by which the transformation actuation forces and the stresses on the transformable wheel are reduced. It is also desirable to provide a transformable wheel and a method of wheel transformation that permits wheel transformation even when a robot or vehicle to which the wheel is installed of significant weight and/or is carrying a heavy load.

SUMMARY

Exemplary transformable wheel and wheel transformation method embodiments described herein overcome the need to lift the weight of an associated robot or vehicle during a wheel transformation operation. To this end, exemplary transformable wheel embodiments utilize one or more passively-actuated segments that are actuated by a spring or elastic force, and not directly by a powered transformation mechanism.

The segments of an exemplary wheel may be produced, for example, by radially dividing the wheel. The wheel segments may be referred to as "legs," particularly when unfolded. The unfolding of these legs alters the shape of the wheel. When the legs are folded, the wheel is more compact, and the shape is generally circular. When the legs are open, the size (e.g., diameter) of the wheel increases, and the shape is non-circular. An exemplary transformable wheel embodiment may have one or more active legs, and one or more passive legs.

Different mechanisms may be used to actuate the active legs, such as without limitation, motor-powered gears or slider-crank mechanisms. The passive leg(s) is not directly actuated by the active leg transformation mechanism but is, instead, drawn towards the other legs by a passive actuation mechanism, such as an elastic cord or spring. Such an elastic cord or spring may be attached to or may run through the passive leg(s), and is also attached to or runs through the active leg(s).

The passive leg(s) is not rigidly coupled to the active leg transformation mechanism. This allows the passive leg(s) to move independently of the active leg(s), thereby allowing the passive leg(s) to be automatically drawn toward the current position of the active leg(s) by the passive leg actuation mechanism.

The opening of an exemplary transformable wheel preferably happens in multiple steps. First, the wheel is aligned such that the passive leg(s) is contacting the ground, and the active leg(s) is off of the ground. Second, the active leg(s) is moved to an open or closed position by the active leg transformation mechanism. Third, the associated robot or vehicle drives the wheel in rotation such that the passive leg(s) is no longer in contact with the ground, whereafter the passive leg(s) is automatically pulled to an open position by the elastic force of the passive leg actuation mechanism.

An exemplary wheel embodiment may also perform such an opening transformation without using the aforementioned exemplary sequence of steps, however, the aforementioned exemplary sequence of steps allows the passive leg(s) to be used in a manner that reduces the force required for transformation. That is, opening the active legs when the active legs are not in contact with the ground eliminates the need for the active leg transformation mechanism to also lift the weight of the associated robot/vehicle as the wheel transformation takes place. The weight of the robot is instead lifted when the robot/vehicle subsequently drives the wheel in rotation, which causes the wheel to rotate up onto the already-extended active leg or one of the already-extended active legs. Thus, the force that must be overcome by the active leg transformation mechanism during a wheel transformation operation is substantially reduced if the initial transformation of the active leg(s) occurs when only the passive leg(s) is in contact with the ground.

Other aspects and features of the general inventive concept will become apparent to those skilled in the art upon review of the following detailed description of exemplary embodiments along with the accompanying drawing figures.

BRIEF DESCRIPTION OF THE DRAWINGS

In the following descriptions of the drawings and exemplary embodiments, like reference numerals across the several views refer to identical or equivalent features, and.

DETAILED DESCRIPTION OF THE EXEMPLARY EMBODIMENTS

One exemplary embodiment of a transformable robotic wheel 5 and an associated exemplary wheel transformation sequence is illustrated in FIGS. 1-7. The wheel 5 is shown in a fully closed position in FIG. 1 and FIG. 4, a partially open position in FIG. 2 and FIGS. 5-6, and a fully open position in FIG. 3 and FIG. 7.

The exemplary transformable wheel 5 is split radially into a plurality of segments (legs) 10a-10d, 15. In this particular example, there are five legs, but there may be a lesser or greater number of legs in other embodiments. As described briefly above, the legs 10a-10d, 15 unfold to increase the size of the wheel and to create a non-circular wheel shape during the wheel transformation operation. One end of each leg 10a-10d, 15 may be pivotally attached to a central hub 20, which may be, for example, integrated into or an end portion of an axle associated with the wheel 5.

In this exemplary wheel embodiment of FIG. 1-7, there are four active legs 10a-10d, and one passive leg 15. The number of active legs and passive legs may vary in other embodiments (see, e.g., FIG. 8), as long as the wheel includes at least one active leg and at least one passive leg. The exemplary transformable wheel 5 is initially shown in a fully closed position in the front view of FIG. 1 and the side view of FIG. 4, with the wheel aligned such that the passive leg 15 is in contact with the surface upon which the wheel rests (e.g., the ground in this example) and the active legs 10a-10d not in contact with the ground or only minimally in contact with the ground.

As explained briefly above, the transformation (i.e., opening) of an exemplary transformable wheel preferably happens in a sequence of multiple steps. A first step in such an opening transformation of the exemplary wheel of FIGS. 1-7 is depicted from a front view in FIG. 2 and a from side view in FIG. 5. As shown, from the initial wheel position of FIG. 1 and FIG. 4, the active legs 10a-10d have been moved to an open position by an active leg transformation (actuating) mechanism (described in more detail below). Note that in the step of the opening sequence shown in FIGS. 2 and 5, the passive leg remains fully or partially closed and is still in contact with the ground.

Figure 1:
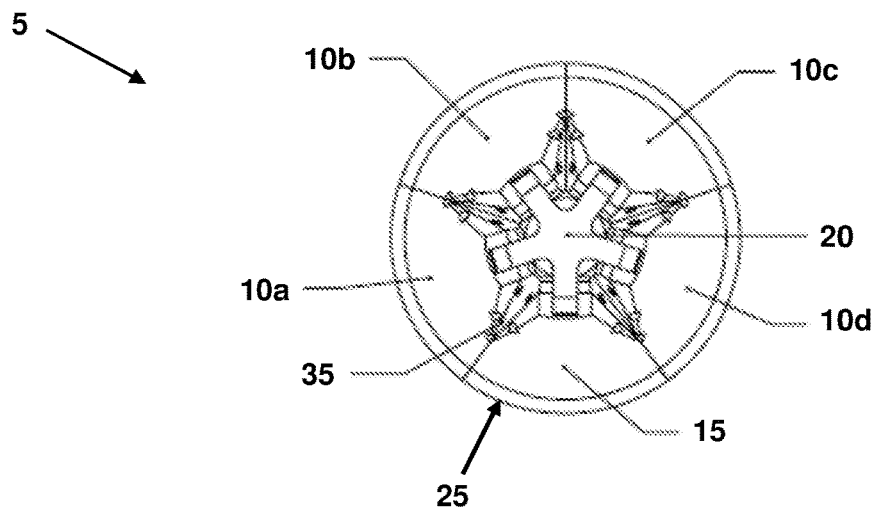
FIG. 1 is a front view of one exemplary embodiment of a transformable wheel in a closed position.
Figure 2:
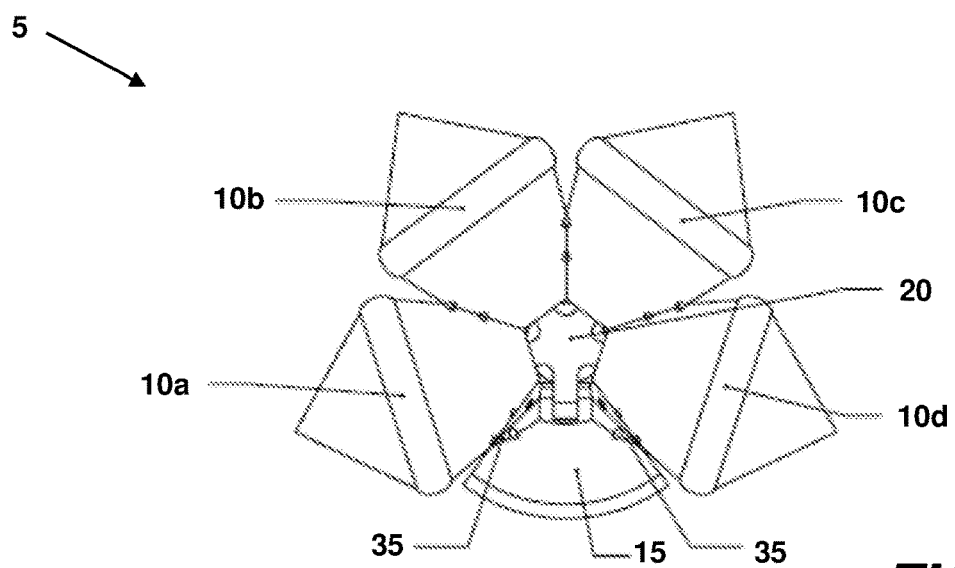
FIG. 2 shows the wheel of FIG. 1 with a plurality of active legs thereof in an open position and a passive leg thereof in a closed position.
Figure 3:
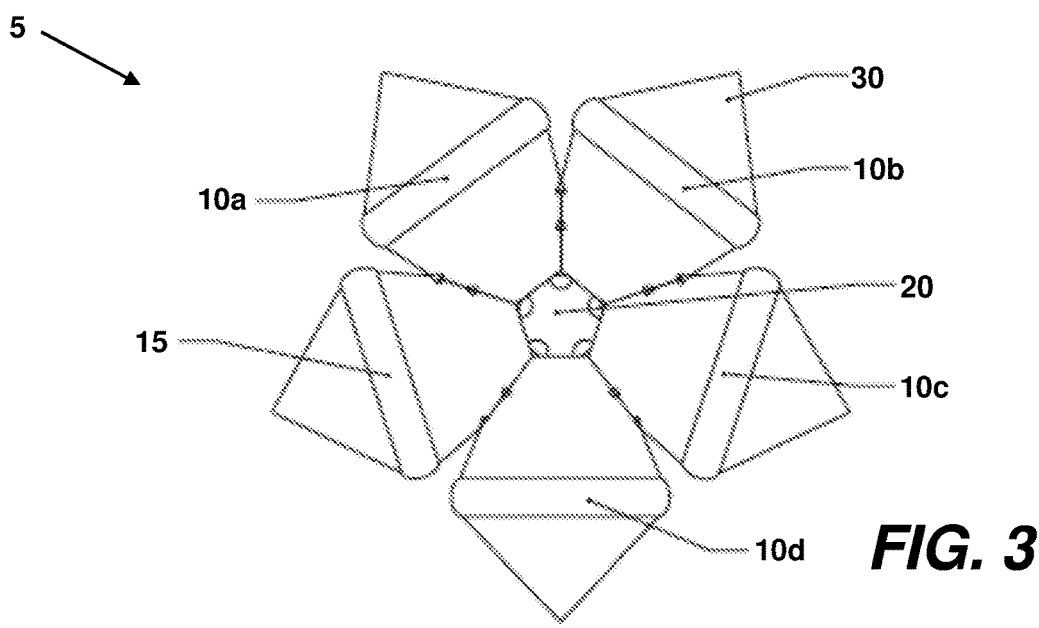
FIG. 3 shows the wheel of FIG. 1 with all of the legs thereof in an open position.
Figure 4:
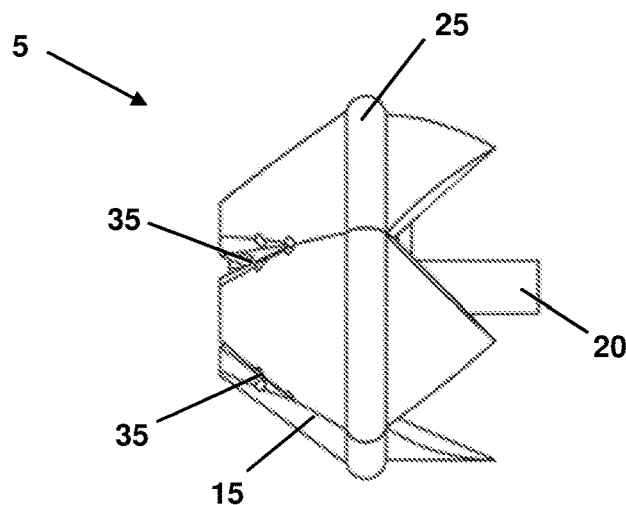
FIG. 4 is a side view of the wheel shown FIG. 1.
Figure 5:
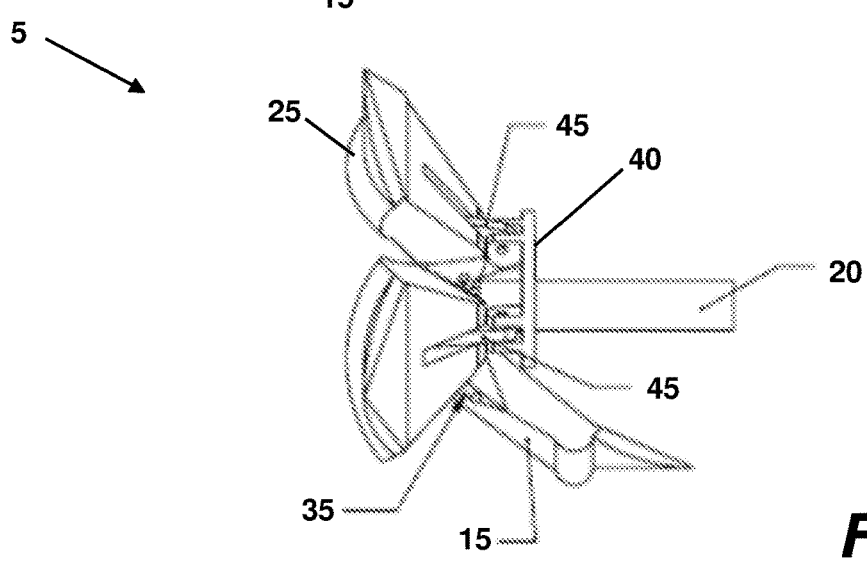
FIG. 5 is a side view of the wheel shown in FIG. 2.
Figure 7:
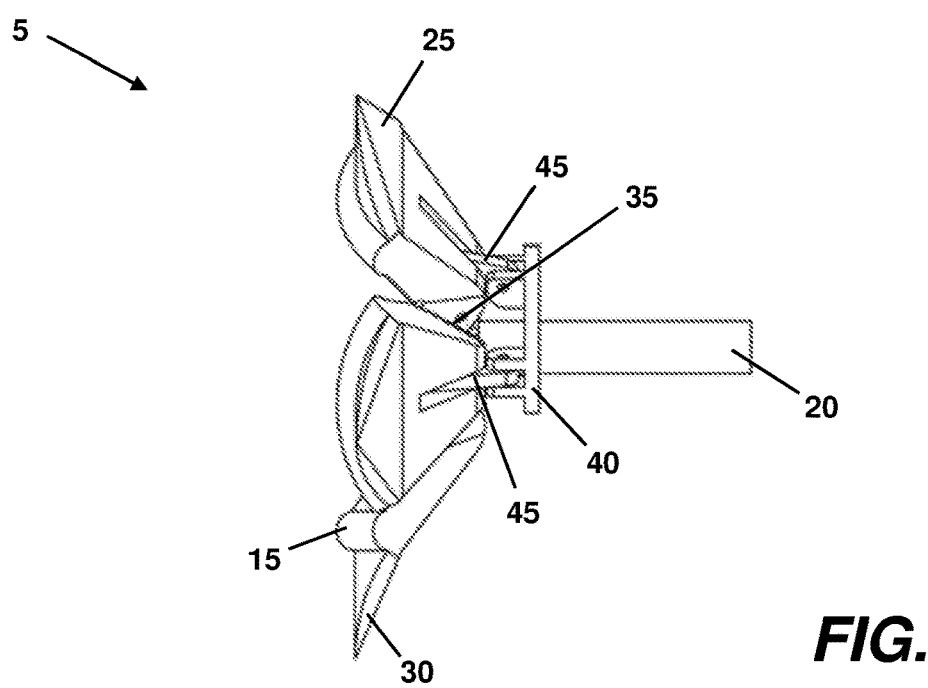
FIG. 7 is a side view of the wheel shown in FIG. 3.
Figure 6:
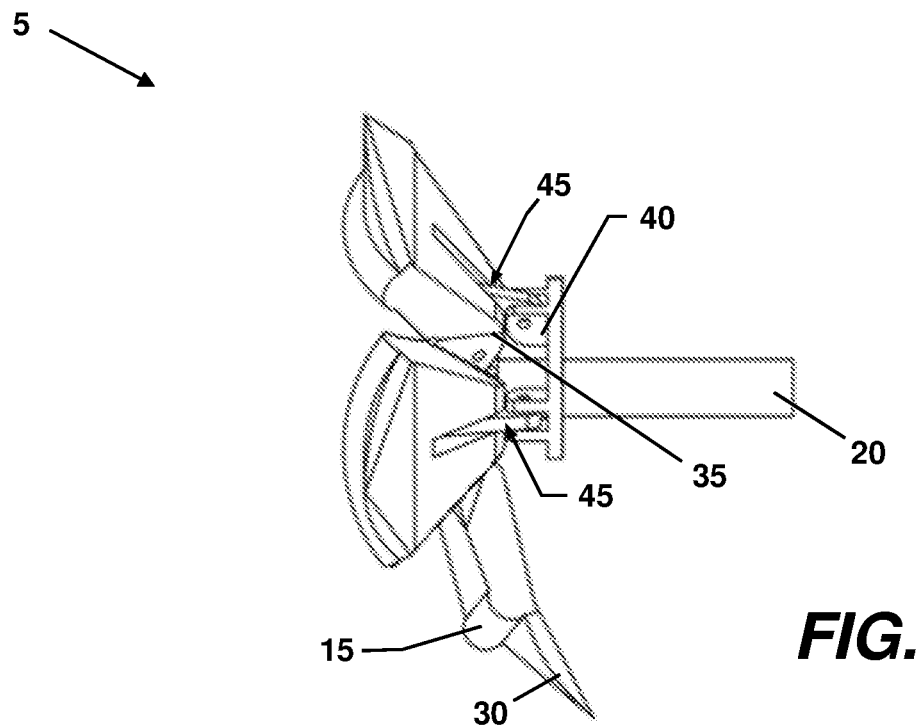
FIG. 6 shows the passive leg of the exemplary transformable wheel transitioning from the closed position of FIGS. 4-5 to an open position as shown in FIG. 7.

A partially open wheel position is represented in FIG. 6, where the passive leg 15 of the exemplary transformable wheel 5 has transitioned to a position that is somewhere between the fully closed position of FIGS. 1 and 4 and the fully open position of FIGS. 3 and 7. In this position, the wheel 5 has been rotationally driven by the associated robot/vehicle such that the passive leg 15 is no longer in contact with the ground and, therefore, has been automatically pulled to the position shown by a passive leg actuation mechanism (described in more detail below). In this example, the transformable wheel 5 has been rotated clockwise by one leg in FIGS. 3 and 6, such that the active leg 10d is in contact with the ground. Obviously, the direction of rotation may vary, and a transformable wheel may be supported by more than one active leg (when present) during passive leg actuation instead of by the single active leg 10d as represented in FIGS. 3 and 6. The passive leg actuation mechanism will eventually move the passive leg 15 from the partially open position shown in FIG. 6 to a fully open position, as represented in FIG. 7.

A closing transformation sequence associated with an exemplary transformable wheel embodiment may be performed substantially in reverse of the sequence described above. For example, in the case of the exemplary transformable wheel 5 of FIGS. 1-7, the open wheel may be rotated to a position where the passive leg 15 is again in contact with the ground and the active legs 10a-10d are not in contact with the ground. The active leg transformation mechanism may then be activated to retract the active legs 10-10d to the closed position of FIGS. 1 and 4 while the weight of the associated robot/vehicle is supported by only the passive leg 15. Consequently, the passive leg(s) of an exemplary transformable wheel may also be used to reduce the transformation force required during wheel closing and when a wheel is moving between intermediate positions.

A closing transformation sequence associated with an exemplary transformable wheel embodiment may instead occur with one or more active legs in contact with the ground. For example, the exemplary transformable wheel 5 of FIGS. 1-7 may undergo a closing transformation with the wheel rotated to a position such as that shown in FIGS. 3 and 7—with one (or more) of the active legs 10a-10d in contact with the ground and the passive leg 15 not in contact with the ground. Because the wheel 5 is closing during this operation rather than opening, the active leg transformation mechanism will not have to lift the weight of the robot/vehicle during the wheel closing sequence. However, the weight of the robot/vehicle will typically urge the legs of the wheel 5 toward a closed position in such a situation— meaning that the active leg transformation mechanism may have to resist the resultant additional closing force. Further, with one or more active legs in contact with the ground during a closing transformation, the frictional forces generated as an active leg is dragged across the ground during closing may be significant, which can make such a closing process difficult, especially on rough terrain. This additionally exemplifies the benefit of using a passive leg during a closing transformation as well as an opening transformation.

When the particular exemplary wheel 5 is in the fully closed position of FIG. 1 and FIG. 4, a rim 25 is formed that allows the wheel to roll efficiently—particularly on flat surfaces. When the wheel 5 is fully open, as is shown in FIG. 3 and FIG. 7, the wheel rolls on wheel tips 30 or spikes of the legs 10-10d, 15, which allows the wheel to better traverse uneven, soft and/or loose terrain, to navigate sudden elevation changes, etc. The wheel tips or similar portions of the legs of other wheel embodiments may differ in appearance from those shown herein, and a wheel may utilize interchangeable wheel tips in other embodiments such that a given set of wheel tips may be selected and installed to best match expected terrain. Obviously, the exact configuration of the legs 10a-10d, 15 may also be different in other embodiments, whether due to expected terrain to be encountered or otherwise, and all such variations are considered to be within the scope of the general inventive concept set forth herein. It is also to be understood that a passive leg(s) may be implemented on an exemplary transformable wheel regardless of the exact configuration of the legs.

Various active/powered mechanisms may be utilized as an active leg transformation mechanism in exemplary transformable wheel embodiments. Likewise, various passive mechanisms may be utilized as a passive leg actuation mechanism in exemplary transformable wheel embodiments. The exemplary transformable wheel 5 of FIGS. 1-7 employs a slider-crank mechanism as a component of an active leg transformation mechanism, and an elastic cord 35 to actuate the passive leg 15. However, it is to be understood that a passive leg(s) may be implemented on an exemplary transformable wheel regardless of the particular mechanisms used to actuate the active leg(s) and passive leg(s).

Portions of various components of one exemplary slider-crank mechanism for actuating the active legs 10-a-10d of the transformable wheel 5 are visible in FIGS. 4-7. For example, a slider ring 40 is shown to encircle the hub (axle) 20 of the wheel 5, and is connected to a plurality of actuation links 45 that couple the slider ring to each of the active legs 10a-10d.

Figure 8:
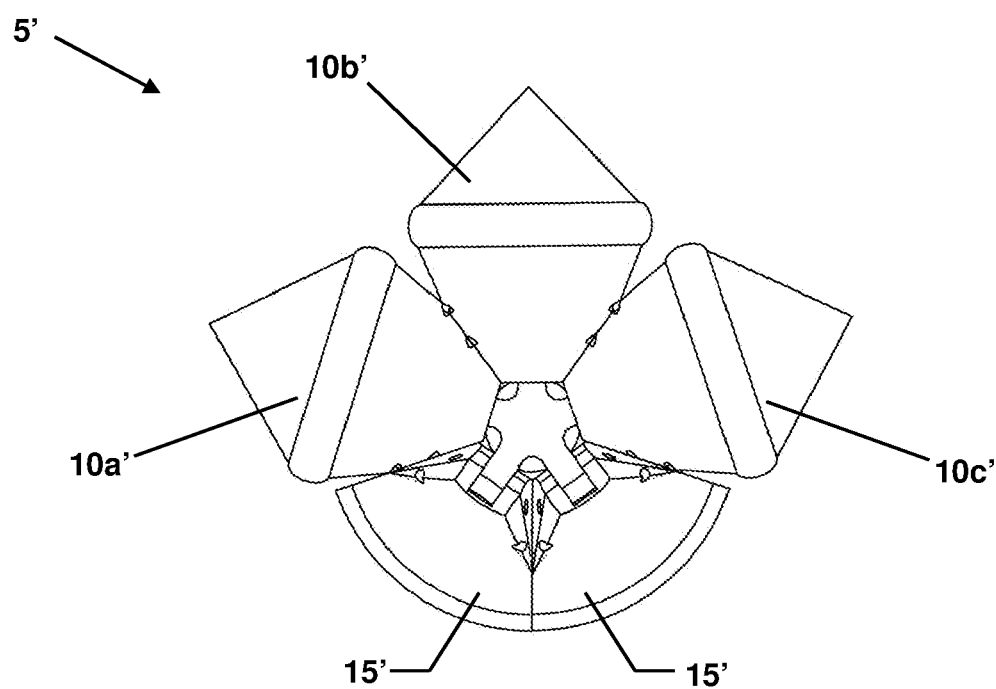
FIG. 8 shows an alternative exemplary embodiment of the transformable wheel of FIGS. 1-7, wherein the five legs of the wheel are comprised of three active legs and two passive legs, with the active legs shown in an open position and the passive legs shown in a closed position.
Figure 9:
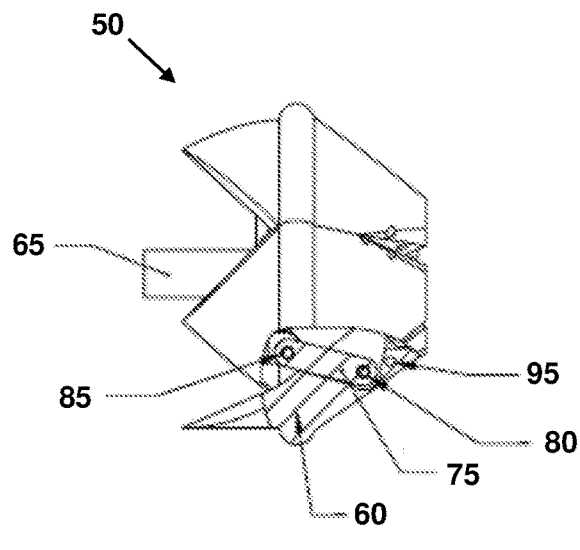
FIG. 9 is a partial sectional side view of one exemplary embodiment of a transformable wheel in a closed position.
Figure 10:
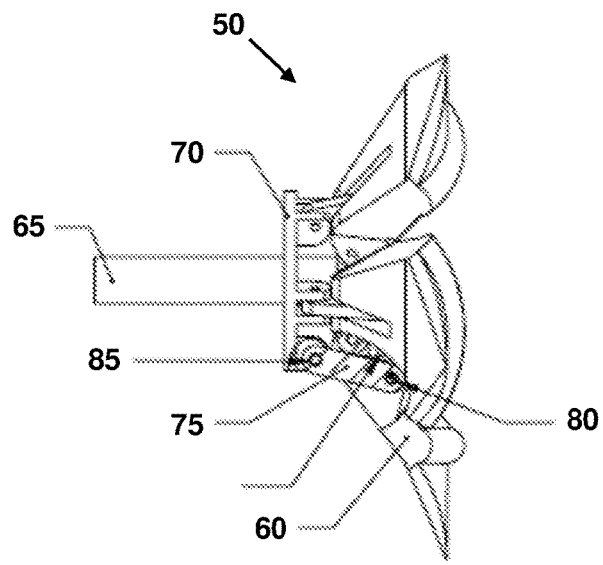
FIG. 10 is a partial sectional side view of the wheel of FIG. 9 in an open position.

As mentioned above, the number of active legs and passive legs may vary in different transformable wheel embodiments, as long as the wheel includes at least one active leg and at least one passive leg. In this regard, FIG. 8 represents an alternative exemplary embodiment of a transformable wheel 5', wherein the five legs of the wheel are comprised of three active legs 10a'-10c' and two passive legs 15', with the active legs shown in an open position and the passive legs shown in a closed position. In FIG. 8, the wheel 5' is aligned such that the passive legs 15' are at least in partial contact with the surface upon which the wheel rests and the active legs 10a'-10c' are not in contact with the ground.

An exemplary slider-crank mechanism that may be employed as an active leg transformation mechanism is shown in more detail in FIGS. 9-12. The slider-crank mechanism is shown installed to an exemplary transformable wheel 50 having at least one passive leg 55 and a plurality of active legs 60. In this embodiment of the transformable wheel 50, all of the passive and active legs 55,60 of the wheel are attached to and pivot about a base, which may be integrated with, or may again be an end portion of, an axle 65 of the wheel 50.

Figure 12:
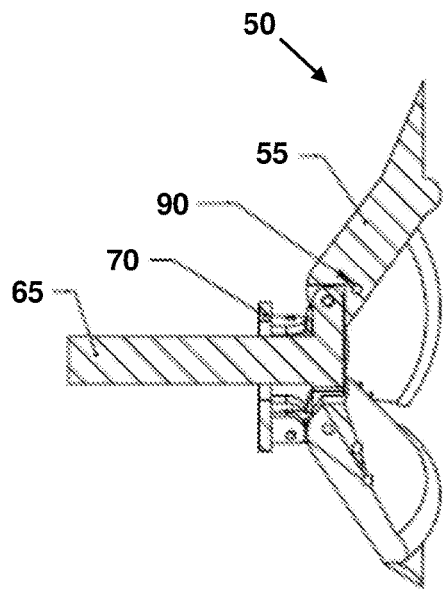
FIG. 12 is a partial sectional side view of the wheel of FIG. 10 with the section taken through a passive leg of the wheel.

A slider ring 70 is again shown to encircle the axle 65 of the wheel 50, and is connected to a plurality of actuation links 75 that couple the slider ring to each of the active legs 60. The actuation links 75 are pivotally coupled to the active legs 60 at point 80 and pivotally coupled to the slider ring 70 at point 85. The slider ring 70 may be connected to a linear actuator (not shown) or to another motive device that is adapted to drive the slider ring in linear reciprocating movement toward and away from the hub end of the axle 65. When the slider ring 70 is driven by the motive device toward the hub end of the axle 65, the actuation links 75 correspondingly force the active legs 60 to pivot about the hub end of the axle 65 to an open (expanded) position, such as is depicted in FIG. 8 and has been described above with respect to the wheel embodiment 5 of FIGS. 1-7. In contrast, when the slider ring 70 is driven by the motive device away from the hub end of the axle 65, the actuation links 75 correspondingly force the active legs 60 to pivot about the hub end of the axle 65 to a closed (contracted) position, such as is depicted in FIG. 12 and has also been described above with respect to the wheel embodiment 5 of FIGS. 1-7. In this manner, the slider-crank mechanism may be used to selectively drive the active legs 60 of the wheel 50 between an open or closed position.

As explained above, the passive leg(s) of an exemplary transformable wheel is not actuated by the active leg transformation mechanism associated with the wheel. Rather, the passive leg(s) employs a separate, passive leg actuation mechanism, to actuate the passive leg(s) during a wheel transformation operation. To this end, the passive leg 55 of the exemplary transformable wheel 50 of FIGS. 9-12 is not coupled to the slider ring 70 as are the active legs 60 and is, therefore, not directly driven by the active leg transformation mechanism.

Figure 11:
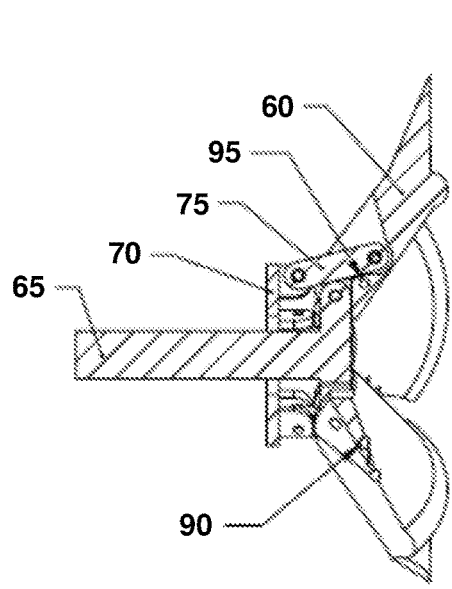
FIG. 11 is a partial sectional side view of the wheel of FIG. 10 with the section taken through an active leg of the wheel.

The differences in the mechanisms for actuating the active legs 60 versus the passive leg(s) 55 of the exemplary transformable wheel 50 may be observed generally in FIGS. 11-12. FIG. 11 clearly shows an active leg 60 driven by an actuation link 75, while FIG. 12 shows a passive leg 55 with no actuation link attached. Thus, it is clear that the active legs 60 are directly driven by the active leg transformation mechanism, while the passive leg(s) 55 is not.

There is also no rigid connection coupling the passive leg(s) 55 to the active legs 60 in this exemplary embodiment of the transformable wheel 50. Rather, the passive leg(s) 55 is drawn toward the current position of the active legs 60 by an elastic or spring force, such as may be provided by an elastic cord or spring(s). In the particular exemplary embodiment of the transformable wheel 50 of FIGS. 9-12, an elastic cord (not visible) is again used to actuate the passive leg(s) 55. In this embodiment, the elastic cord passes through the passive leg(s) 50 and through all of the active legs 60, thereby joining all of the legs. Holes 90, 95 are respectively provided in the passive leg(s) and the active legs to permit passage there through of the elastic cord. The elastic cord has the shortest length, and is the least stretched, when the passive leg(s) 55 is in the same position as the active legs 60. Actuation of the passive leg(s) results from stretching of the elastic cord (see generally, e.g., FIG. 5) when the passive leg(s) 55 is in a different position than the active legs 60. That is, the force that results from stretching of the elastic cord when the position of the passive leg(s) 55 and active legs 60 is dissimilar, pulls the passive leg(s) toward the position of the active legs—regardless of whether the active legs are in an open, closed, or intermediate position.

Figure 13:
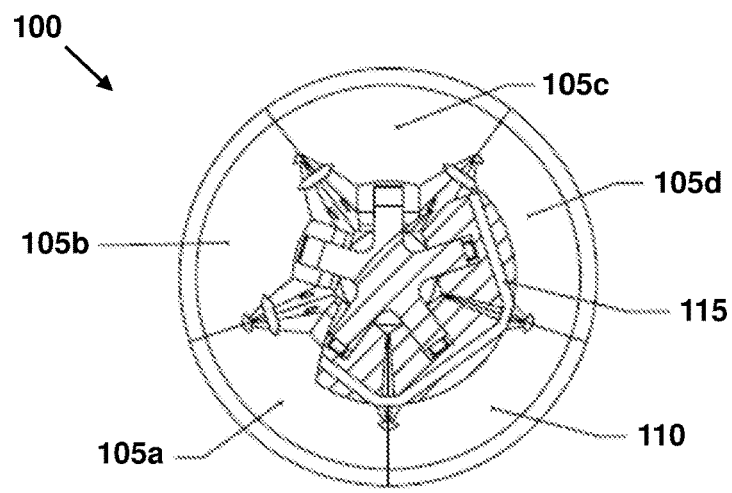
FIG. 13 is a partial sectional front view of one exemplary embodiment of a transformable wheel in an open position, wherein the wheel employs an elastic cord to actuate a passive leg.

FIG. 13 better illustrates how an elastic cord may interconnect the various legs of an exemplary transformable wheel. More particularly, FIG. 13 shows an exemplary transformable wheel 100 that again includes a plurality of legs—in this case, four active legs 105a-105d and a single passive leg 110. Other numbers and combinations of legs are possible in other embodiments. An elastic cord 115 is shown to pass through and connect all of the legs 105a-105d, 110. Consequently, when a powered active leg transformation mechanism (not shown in FIG. 13) is used to change the position of the active legs 105a-105d during a wheel opening or closing operation, the passive leg 110 will, as described in more detail above, be automatically drawn toward the new position of the active legs by the elastic force of the elastic cord 115.

Figure 14:
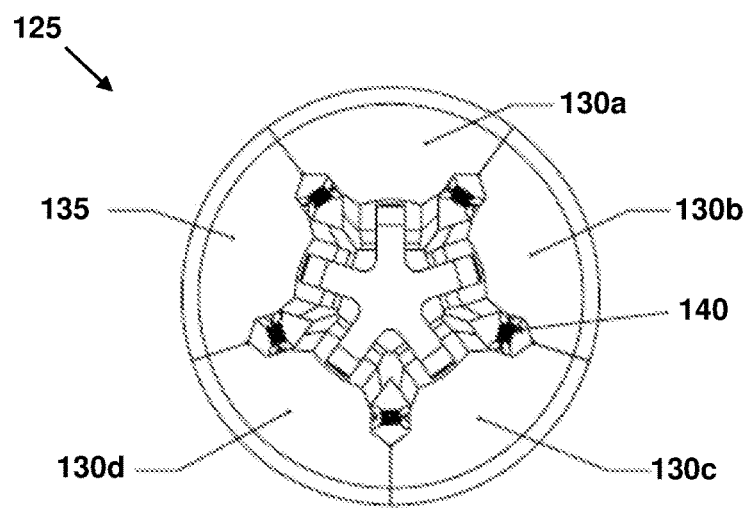
FIG. 14 is a partial sectional front view of one exemplary embodiment of a transformable wheel in an open position, wherein the wheel employs springs to actuate a passive leg.

FIG. 14 illustrates an alternate embodiment of an exemplary transformable wheel 125. For purposes of simplicity, the exemplary transformable wheel 125 again has four active legs 130a-130d and one passive leg 135. Other numbers and combinations of legs are possible in other embodiments.

The transformable wheel 125 may be similar to the exemplary transformable wheel embodiments 5, 50, 100 described above, except that the exemplary transformable wheel 125 of FIG. 14 employs a plurality of springs 140 to actuate the passive leg 135 instead of an elastic cord. Particularly, springs 140 are used to connect all of the legs 130a-130d, 135 of the exemplary transformable wheel 125 of FIG. 14. Therefore, when a powered active leg transformation mechanism (not shown in FIG. 14) is used to change the position of the active legs 130a-130d during a wheel opening or closing operation, the passive leg 135 will, as previously explained above, be automatically drawn toward the new position of the active legs by the elastic force of the springs 140.

Figure 15:
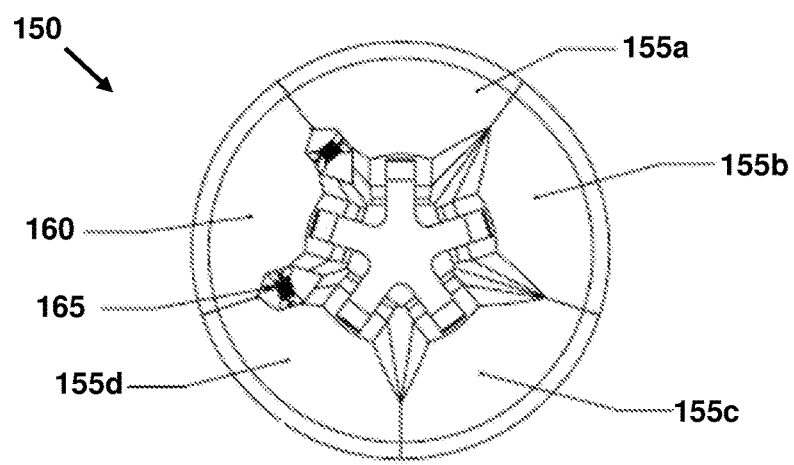
FIG. 15 is a partial sectional front view of another exemplary embodiment of a transformable wheel in an open position, wherein the wheel employs springs to actuate a passive leg.

FIG. 15 illustrates another alternate embodiment of an exemplary transformable wheel 150. For purposes of simplicity, the exemplary transformable wheel 150 again has four active legs 155-155d and one passive leg 160. Other numbers and combinations of legs are possible in other embodiments.

The transformable wheel 150 is similar to the exemplary transformable wheel embodiment 125 described above, except that not all of the legs 155a-155d, 160 of the exemplary transformable wheel 150 of FIG. 14 are connected by springs. Particularly, in this exemplary transformable wheel embodiment, springs 165 are used to join the passive leg to only the active legs 155d, 155a adjacent thereto. Nonetheless, when a powered active leg transformation mechanism (not shown in FIG. 15) is used to change the position of the active legs 135a-155d during a wheel opening or closing operation, the passive leg 160 will, as previously explained above, be automatically drawn toward the new position of the active legs by the elastic force of the springs 165.

As should be understood by one of skill in the art from a reading of the foregoing description of exemplary embodiments and a corresponding review of the accompanying drawing figures, if the passive leg(s) of a given transformable wheel is restricted by the ground or by another force and is unable to rotate freely, the elastic actuation force of the associated passive leg actuation mechanism does not prevent movement of the active legs or rotation of the wheel. The active legs may still be opened or closed while movement of the passive leg(s) is restricted. Once movement of the passive leg(s) is no longer restricted, the passive leg(s) will automatically move to the position of the active legs, completing the transformation.

Further, while several exemplary transformable wheel embodiments and associated wheel transformation methods have been described above in the context of performing a wheel opening or closing operation only when a passive leg(s) of the wheel is in contact with the ground or another surface upon which the wheel rests, it is to be understood that transformation of an exemplary wheel embodiment does not require such an absolute state of contact or non-contact. For example, the use of a passive leg is desirable even if a transformable wheel embodiment must transform from a closed state to an open state with the weight of an associated robot/vehicle only partially supported by a passive leg(s) of the wheel. That is, while an associated active leg transformation mechanism may have to exert a greater transformation force in such a situation, the overall weight of the robot/vehicle that must be lifted during the opening operation is nonetheless reduced because a portion of the robot/vehicle weight is still borne by the passive leg.

Exemplary transformable wheel embodiments may utilize any manner of springs, elastic elements, or similar mechanisms to actuate the passive leg(s) towards the position of the active legs of the wheel. As mentioned above, exemplary transformable wheel embodiments may also employ different configurations of active and passive legs, with deferring motion and transformation states. Thus, exemplary transformable wheel embodiments may be realized in various different permutations with differing geometries and implementations.

Comparable transformable wheel designs that do not utilize one or more passive legs require more force from an associated transformation mechanism to open the wheel, as the weight of the robot/vehicle to which the wheel is installed must also be lifted by the transformation mechanism as the legs of the wheel are unfolded. Transformable wheel designs that do not utilize one or more passive legs may also require more force from the transformation mechanism to close the wheels or to move between intermediate wheel positions. Also, as no significant force restricts opening of the active legs of an exemplary transformable wheel during wheel transformation other than the described spring or elastic forces associated with the passive leg(s), stresses on the various exemplary transforming wheel components are less in comparison to the stresses experienced by the components of known transformable wheels having active legs that must be opened while the movement of said legs is restricted by the ground or otherwise.

Nothing herein is to be interpreted as limiting the size or shape of an exemplary transforming wheel, nor the material used to construct a transformable wheel. For example, while exemplary transformable wheel embodiments have been described herein as usable with robot/vehicle applications, such descriptions are not intended to limit exemplary transformable wheels to such applications or to miniature scale or other greatly reduced scale applications. Rather, it is believed that exemplary transformable wheel embodiments may find many uses and may be scaled between very small and very large applications. Likewise, while the general inventive concept has been described in both summary form and using detailed examples, it will be understood that changes, substitutions, and variants may be made to the described details, without departing from the spirit of the inventive concept. Therefore, while certain exemplary embodiments are described in detail above, the scope of the inventive concept is not considered limited by such disclosure, and modifications are possible without departing from said scope as evidenced by the following claims:

What is claimed is:

1. A shape-transformable wheel assembly, comprising:
a plurality of radially divided wheel segments, the wheel segments forming at least one passive leg and at least one active leg;
an active leg actuating mechanism connected to the at least one active leg and operable to move the at least one active leg between an open and a closed position; and
a passive leg actuating mechanism, the passive leg actuating mechanism connected to the at least one passive leg and operable to move the at least one passive leg between an open position and a closed position independently of movement of the at least one active leg;
wherein, in the event of a positional mismatch between the at least one passive leg and the at least one active leg, the passive leg actuating mechanism is adapted to move the at least one passive leg toward a position that matches the position of the at least one active leg.

2. The transforming wheel assembly of claim 1, wherein a periphery of the wheel is substantially circular in shape when the radially divided wheel segments are in the closed position and substantially irregular in shape when the radially divided wheel segments are in the open position.

3. The transforming wheel assembly of claim 1, further comprising a slider crank mechanism that is coupled to the at least one active leg and is linearly displaceable by the active leg actuating mechanism.

4. The transforming robotic wheel assembly of claim 3, wherein the slider crank mechanism includes at least one actuation link that connects the at least one active leg to a slider ring.

5. The transforming wheel assembly of claim 1, wherein:
the passive leg actuating mechanism is at least one biasing element selected from the group consisting of an elastic cord and a spring; and
the at least one biasing element connects the at least one passive leg to the at least one active leg.

6. The transforming wheel assembly of claim 5, wherein the at least one biasing element is a plurality of springs that connect the at least one passive leg to the at least one active leg.

7. The transforming wheel assembly of claim 1, wherein the passive leg actuating mechanism is operable to move the at least one passive leg between the open position and the closed position only when the at least one passive leg is not in contact with a surface upon which the wheel resides.

8. The transforming wheel assembly of claim 1, further comprising a central hub to which one end of the at least one passive leg and one end of the at least one active leg is pivotally connected.

9. The transforming wheel assembly of claim 8, wherein the central hub is integrated into or is formed by an end portion of an axle of a vehicle to which the wheel is installed.

10. A method for transforming the shape of a wheel between an expanded state and a retracted state, comprising:
providing a shape-transformable wheel, the wheel comprising:
a plurality of radially divided wheel segments, the wheel segments forming at least one passive leg and at least one active leg,
an active leg actuating mechanism connected to the at least one active leg and operable to move the at least one active leg between an open, expanded position and a closed, retracted position, and
a passive leg actuating mechanism connected to the at least one passive leg and operable to move the at least one passive leg between an open, expanded position and a closed, retracted position, independently of movement of the at least one active leg;
rotating the wheel to a position where only the at least one passive leg is in contact with a surface upon which the wheel resides;
using the active leg actuating mechanism to change the position of the at least one active leg from the retracted position to the expanded position or vice versa; and
rotating the wheel to a position where the at least one passive leg is not in contact with the surface upon which the wheel resides;
whereupon the passive leg actuating mechanism will automatically move the at least one passive leg to match the changed position occupied by the at least one active leg.

11. The method of claim 10, wherein the position of the at least one passive leg is moved toward the position of the at least one active leg by at least one biasing element that connects the at least one passive leg to the at least one of active leg.

12. The method of claim 11, wherein the at least one biasing element is selected from the group consisting of an elastic cord and a plurality of springs.

13. The method of claim 10, wherein none of the weight of a vehicle to which the wheel is installed is borne by the at least one active leg during a positional change thereof.

14. A transformable wheel assembly including a wheel that is transformable between an expanded state and a retracted state, the wheel assembly comprising:
a central hub;
a plurality of radially divided wheel segments each pivotally connected at one end to the central hub, at least of one of the wheel segments forming a passive leg while the remaining segments form multiple active legs;
a powered active leg transformation mechanism connected to the active legs and operable to move the active legs between a closed, retracted position, and an open, expanded position;
a passive leg actuating mechanism in the form of at least one elastic biasing element, the passive leg actuating mechanism connected to the at least one passive leg and operable to move the at least one passive leg, independently of movement of the active legs, between a closed, retracted position, and an open, expanded position;
wherein, upon a positional mismatch between the active legs and the at least one passive leg, the passive leg actuating mechanism is adapted to automatically move the at least one passive leg to a position that matches the position of the active legs when there is no contact between the at least one passive leg and a surface upon which the wheel resides.

15. The transformable wheel assembly of claim 14, wherein a periphery of the wheel is substantially circular in shape when the radially divided wheel segments are in the retracted position and substantially irregular in shape when the radially divided wheel segments are in the expanded position.

16. The transformable wheel assembly of claim 14, wherein the active leg transformation mechanism includes a slider-crank mechanism.

17. The transformable wheel assembly of claim 14, wherein the at least one elastic biasing element is an elastic cord that connects the at least one passive leg to one or more of the active legs.

18. The transformable wheel assembly of claim 14, wherein the at least one biasing element is a plurality of springs that connect the at least one passive leg to adjacent ones of the active legs.

19. The transformable wheel assembly of claim 14, wherein the central hub is integrated into or is formed by an end portion of an axle of a vehicle to which the wheel is installed.

* * * * *